United States Patent
Skrak et al.

(12) 
(10) Patent No.: US 6,725,631 B2
(45) Date of Patent: Apr. 27, 2004

(54) APPARATUS AND METHOD FOR STRIPPING FILMIC CASINGS FROM PRODUCTS

(76) Inventors: Branko Skrak, 5453 Elgar Court, Mississauga, Ontario (CA), L5M 5C9; Terry W. Thomson, 5876 Glen Erin Drive, Mississauga, Ontario (CA), L5M 5K4

( * ) Notice: Subject to any disclaimer, the term of this patent is extended or adjusted under 35 U.S.C. 154(b) by 0 days.

(21) Appl. No.: 10/146,817

(22) Filed: May 17, 2002

(65) Prior Publication Data

US 2002/0162303 A1 Nov. 7, 2002

Related U.S. Application Data

(63) Continuation-in-part of application No. 09/849,314, filed on May 7, 2001, now abandoned.

(51) Int. Cl.⁷ .............................................. B65B 43/20
(52) U.S. Cl. ........................ 53/492; 53/381.2; 53/384.1
(58) Field of Search ............................. 53/492, 381.2, 53/384.1; 414/412; 99/537; 452/49, 50

(56) References Cited

U.S. PATENT DOCUMENTS

| | | | | |
|---|---|---|---|---|
| 2,463,157 A | * | 3/1949 | Deitrickson | 452/49 |
| 2,670,498 A | * | 3/1954 | Mosby | 452/50 |
| 2,676,354 A | * | 4/1954 | Mosby | 452/31 |
| 2,800,681 A | * | 7/1957 | Demarest | 452/31 |
| 4,158,417 A | * | 6/1979 | Inoue | 414/412 |
| 4,463,641 A | * | 8/1984 | Sato | 83/175 |
| 4,637,095 A | * | 1/1987 | Maruska | 452/50 |
| 4,682,387 A | * | 7/1987 | Leining | 452/50 |
| 5,094,649 A | * | 3/1992 | Hall et al. | 452/50 |
| 5,375,961 A | * | 12/1994 | Mojden et al. | 414/412 |
| 5,928,073 A | * | 7/1999 | Andersson et al. | 452/50 |
| 6,059,647 A | * | 5/2000 | Imaura | 452/50 |

* cited by examiner

Primary Examiner—Stephen F. Gerrity
Assistant Examiner—Hemant M. Desai
(74) Attorney, Agent, or Firm—McCarthy Tetrault; John R. S. Orange

(57) ABSTRACT

The invention provides an apparatus and a method for processing packages made up of a filmic casing containing a product, to separate the casing from the product for subsequent further processing of the product. The package is moved through a series of steps to first weaken the casing, and then a leading end of the moving casing is gripped and the end of the casing is moved away from the product. As a result the casing is stripped off the product as the weakened casing opens and the product continues to move.

31 Claims, 6 Drawing Sheets

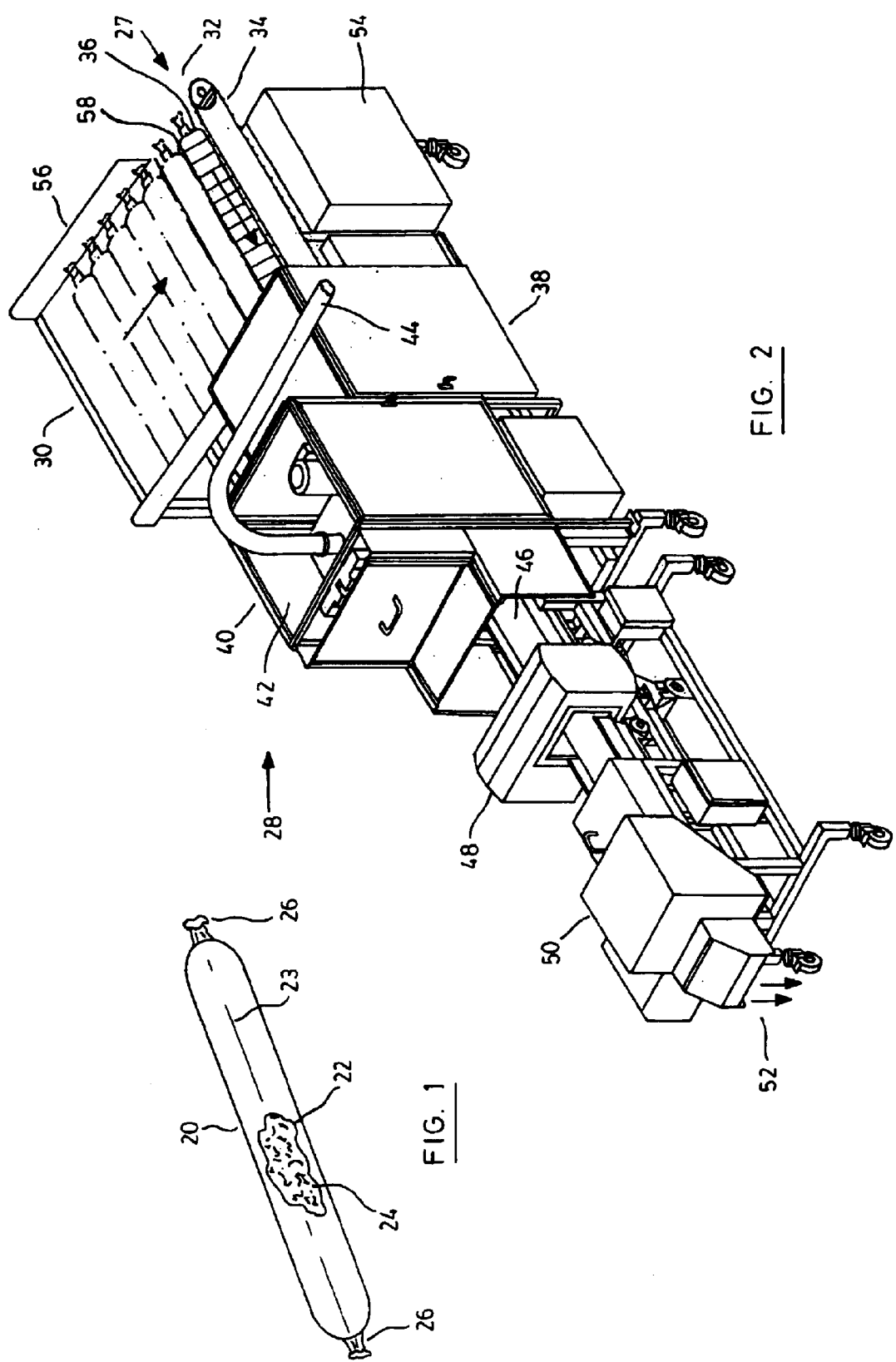

APPARATUS AND METHOD FOR STRIPPING FILMIC CASINGS FROM PRODUCTS

This application is a continuation-in-part of U.S. application Ser. No. 09/849,314 now abandoned filed on May 7, 2001 the content of which is incorporated herein by reference.

FIELD OF THE INVENTION

This invention relates to an apparatus and a method for removing product from a package having a filmic casing containing the product, and more particularly but not exclusively to an apparatus and method for removing such a filmic casing from a food product held by the casing in an elongate and generally cylindrical package.

BACKGROUND OF THE INVENTION

The invention will be described with particular reference to packaging bulk minced meat in filmic casings for subsequent delivery to a processor who converts the bulk minced meat into discrete packages for retail distribution. The present invention is useful in opening the casings and separating the casings from the meat so that the meat can be converted into the aforementioned discrete packages.

When animals, (notably beef stock) are processed for food, some of the resulting meat is minced and packaged in bulk in elongate filmic casings which are closed at the ends by various: means including metal; clips, heat sealing, etc. These packages are then shipped to processors who open the packages manually to strip the filmic casing away from the meat. The meat is then further processed into consumer orientated packages.

The manual process of stripping the casing is both time consuming and subject to losses because some of the meat and juices remain in the spent casings. Further the risk of contamination is always exacerbated when there is a need for human intervention in a process involving food preparation.

Accordingly, it is among the objects of the invention to provide an apparatus and a method that limits human intervention when filmic casings are stripped from packages for extracting the product from the packages for further processing.

SUMMARY OF THE INVENTION

In one of its aspects, the invention provides an apparatus and a method for processing packages made up of a filmic casing containing a product, to separate the casing from the product for subsequent further processing of the product. The package is moved through a series of steps to first weaken the casing, and then a leading end of the moving casing is gripped and the end of the casing is moved away from the product. As a result the casing is stripped off the product as the weakened casing opens and the product continues to move.

BRIEF DESCRIPTION OF THE DRAWINGS

The invention will be better understood with reference to the accompanying drawings, in which:

FIG. 1 is an isometric view of a package with a portion broken away to better show a typical product to be processed by the invention;

FIG. 2 is a diagrammatic perspective view of apparatus according to a preferred embodiment of the invention, and showing stations in the apparatus that are used in practicing a preferred embodiment of a method according to the invention;

DESCRIPTION OF THE PREFERRED EMBODIMENTS

Figure 3:
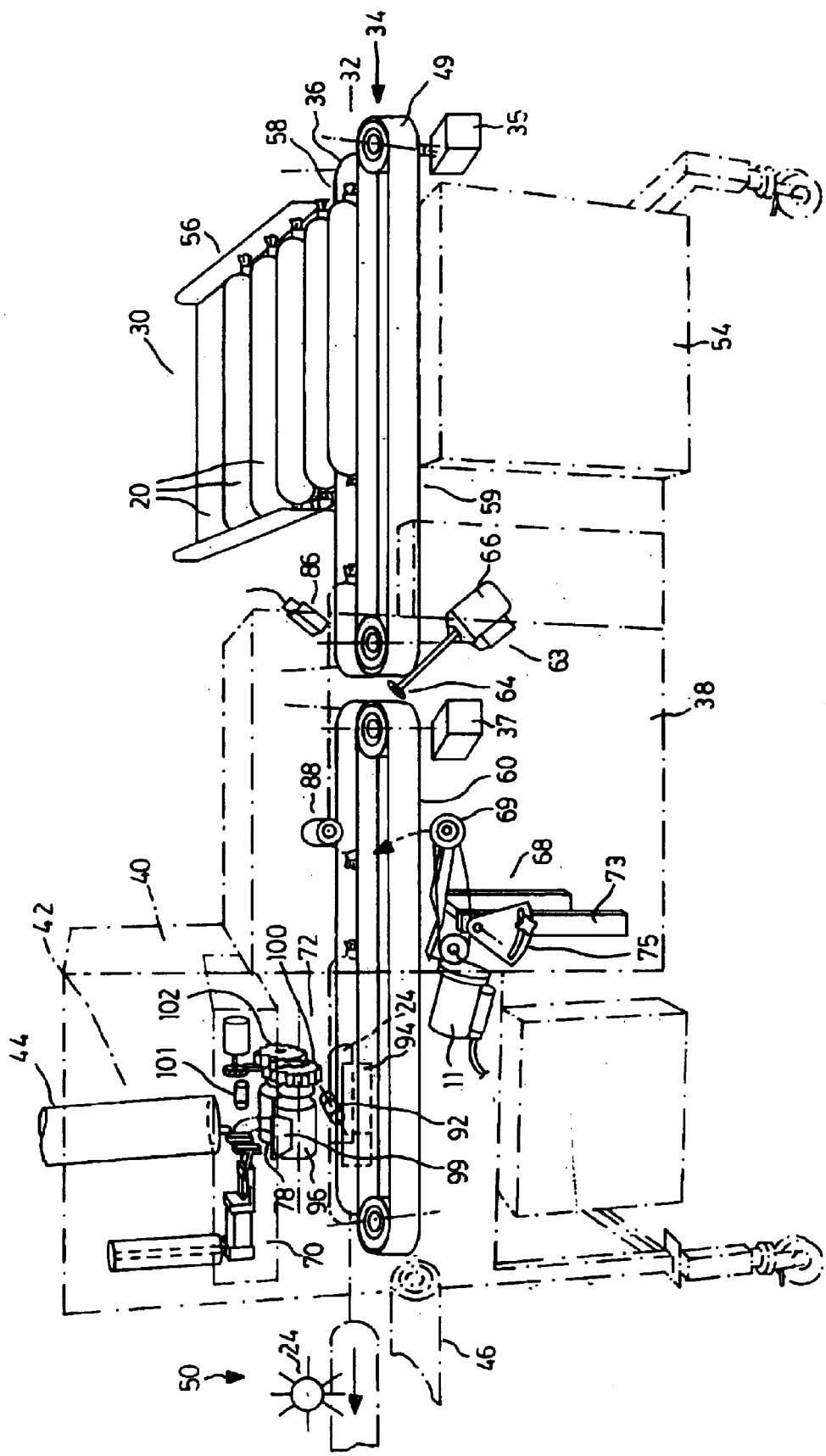
FIG. 3 is a diagrammatic perspective view of the apparatus with portions in ghost outline to permit illustration of major components of the apparatus.

Reference is first made to FIG. 1 which illustrates a package 20 of the type to be opened by apparatus according to the invention. The package 20 in this example consists of a filmic casing 22, which is conveniently tubular, and minced meat product 24 packed into the casing. The filmic casing 22 typically has a seam 23 extending longitudinally that is formed in the manufacture of the casing. The ends of the casing in this exemplary package are secured by crimped metal clips 26 which seal the casing to exclude invasion by fluids and bacteria, and so that the sealed package 20 can be shipped to a food processor. Here the package 20 is opened to release the product 24 for further processing into consumer orientated packages. The apparatus according to the invention is provided to perform this process.

Reference is now made to FIGS. 2 and 3, which are somewhat diagrammatic representations of a preferred embodiment of the apparatus according to the invention, and designated generally by the numeral 28. The apparatus 28 has stations along an operating path (indicated generally by the numeral 29) and which extend along the length of the apparatus. Packages 20 of processed product (which in this example is minced meat) are stored on a loader 30 ready for automatic transfer from the loader 30 into the path 29 where they meet a V-shaped conveyor 32 forming part of a transport mechanism which moves the packages through the apparatus. This conveyor is made up of two similar belt conveyors 34, 36 each having a pair of belts inclined with respect to one another to better support the package 20 in alignment with the operating path 29 and each driven by respective motors 35, 37.

The package 20 is moved along the operating path 29 to pass sequentially through a cutting station 38 on conveyor 34 where the filmic casing 22 (FIG. 1) is slit and then through a stripper 40 on conveyor 36 where the slit casing is pulled off the product and fed through an exhaust system 42 having a pipe 44. The casing 22 is driven through the pipe 44 under the influence of suction applied to the pipe 44 externally by a conventional vacuum exhaust system.

At this point the separated product 24 retains its compacted shape and passes off the V-shaped conveyor 32 onto a flat belt 46 which carries the product through a metal detector 48 to ensure that there is no metal (such as clips off the casing) in the product. The product then passes through a chopper 50 which simply breaks the product down into more manageable pieces before the product exits through an outlet 52 for collection in any convenient way. Of course equipment used in further processing can be arranged to receive the product directly from the outlet 52.

The apparatus is constrained to follow a predetermined sequence of steps using conventional switching and sensing devices controlled electrically from a controller 54. The controller 54 typically utilises a PLC control system to adjust operation of the motors in accordance with sensed conditions and defined algorithms.

Reference is next made to FIG. 3 to describe in general terms the operation of the loader 30, cutting station 38 and stripper 40. The operation will subsequently be described in more detail with reference to FIGS. 4 to 8. As seen in FIG. 3, packages 20 are placed on the loader 30 in parallel for moving down a ramp 56 under the influence of gravity to meet an elevator 58 (better seen in FIG. 1). The controller 54 operates to move packages one by one to the conveyor 32 with a predetermined space between packages sufficient to ensure that the packages are processed individually. The spacing can be varied as will be explained with reference to FIG. 4.

The V-shaped conveyor 32 is in two parts, 59, 60 with a space 62 between the parts sufficient to provide clearance for a transverse cutter 63 which has a circular cutting blade 64. The blade 64 is driven directly by a motor 68 which is mounted to move into position to cut the package 20 and to then to withdraw below the operating path 29 remote from the package. This action on a package will be described in more detail with reference to FIG. 5.

After passing the transverse cutter 63, the package will meet a longitudinal cutter 68 having a cutting blade 69 driven by a motor 71. The longitudinal cutter 68 is mounted on a fixed bracket 73 and has an angular adjuster 75 for setting of the effective height of the blade 69. This allows the cutter 66 to be set to different heights of package 20 in the conveyor 32 to ensure that the longitudinal cutting action is completed, as will be described.

The arrangement of cutters 63 and 68 is such that the resulting transverse and longitudinal slits in the casing meet to form a generally T-shaped slit with the transverse slit being near the clip 26 on the leading end of the package 20.

At this point the casing 22 is ready to be stripped off the product. To do this, a gripper 70 is lowered into alignment with the package 20 and the gripper operates to grab the casing 22 and clip 26 before moving upwardly away from the operating path 29 to drag the casing 22 off the product 24. Once the gripper has moved above drivers 72, a pair of drive rolls come together to assist in moving the casing 22 upwardly into the pipe 44 of the exhaust system 42 whereupon the casing 22 is released and allowed to travel through the pipe under the influence of the exhaust system 42, and in particular a vacuum source applied to the pipe to draw the casing through the pipe 44 and in to a refuse container (not shown). The product 24 is then free of the casing 22 and continues to travel along the path 29 before leaving the conveyor 32 and dropping onto the belt 46 (shown in FIG. 3 in ghost outline).

Once on the belt 46, the chopper 50 separates the product into smaller chunks. The chopper 50 includes a central hub 51 with radial vanes 53 secured to the hub 51. The hub 51 rotates about an axis transverse to the direction of movement of the belt 46 to bring the vanes 53 into contact with the product 24 and break it into smaller pieces. The vanes penetrate to the depth of the cut made by the blade 69 to facilitate separation.

The process will now be described in more detail with reference to FIGS. 4 to 8 to show how the apparatus interacts with packages and to better explain the method according to the invention.

Figure 4:
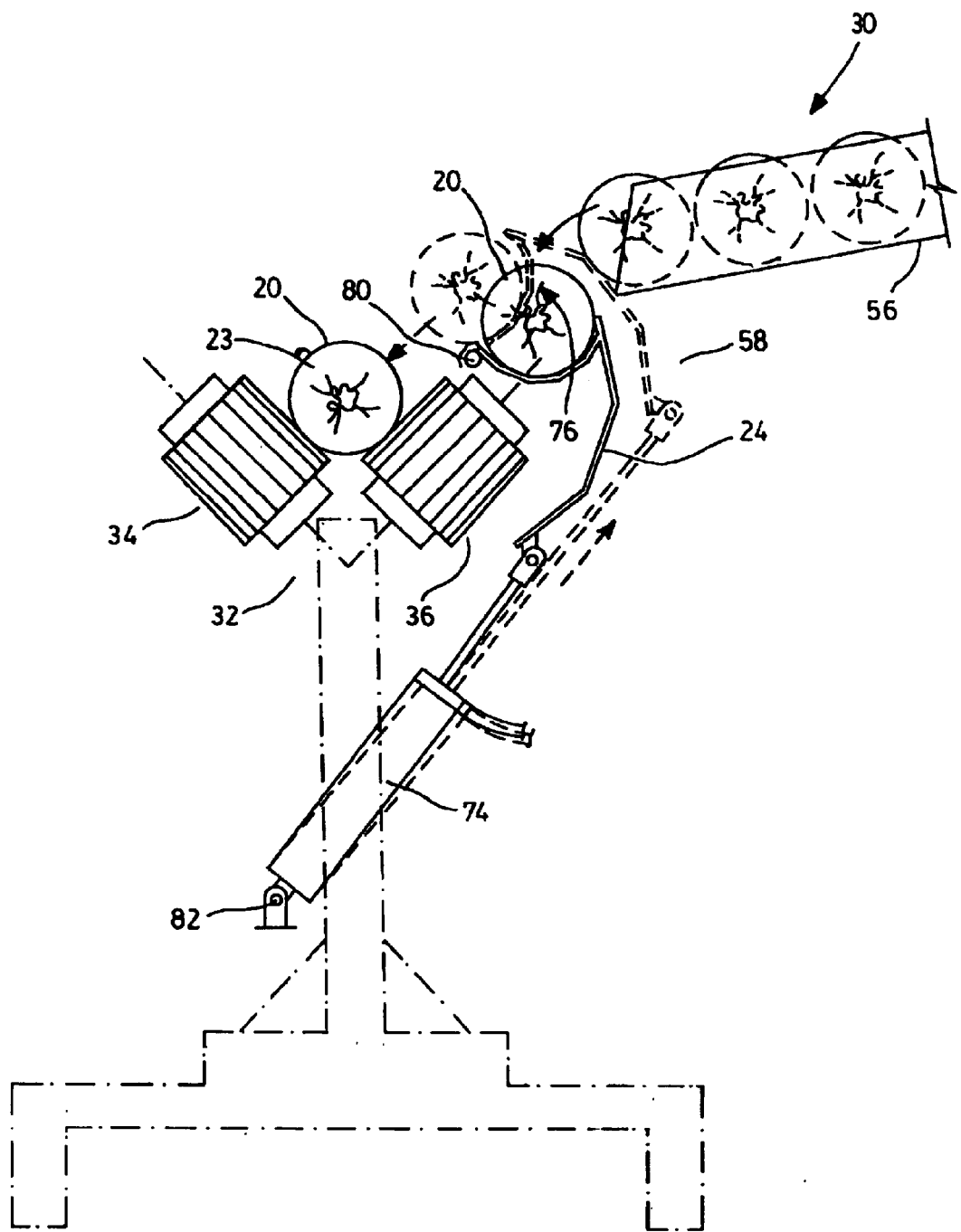
FIG. 4 is an end view looking from the right of FIG. 3, and illustrating a loader used to feed packages into the apparatus and including background parts in ghost outline.

Reference is now made to FIG. 4 which shows the loader 30 as seen from the right end of FIG. 2. Packages 20 are stored on the ramp 56 ready to meet the elevator 58 which handles one package 20 at a time. When the apparatus is ready for another package, an actuator 74 is energised to drive an elongate tray 76 about a pivot 80 which extends in parallel with the path 29 (FIG. 2). The actuator 74 is hinged at 82 to allow changes in alignment as the tray 76 rotates and elevates a package 20 into elevated position, shown in ghost outline. The package is then free to fall into the conveyor 32. The tray 76 is shaped so that as it is elevated, a retaining wall 84 comes into play to restrict any movement of the next package 20 to thereby retain the packages on the ramp 56. The packages are oriented so that when located on the conveyor 32, the seam 23 is uppermost but slightly off centre. This has been found to facilitate operation of the cutting station 38.

When the tray 76 returns to the lowered position, shown in full outline, the next package 20 will roll onto the tray ready for movement onto the conveyor 32. As a result, the packages 20 are delivered one at a time onto the conveyor 32 for movement into the cutting station 28 (FIG. 2). Also, the packages are spaced along the constant speed conveyor 32 by varying the rate of operation of the actuator. Consequently the spacing can be increased by slowing the actuator 74 and conversely increased by making the actuator move more quickly.

It will be appreciated that manual loading of the conveyor 32 is also possible to avoid the complexity of the loader 30.

Figure 5:
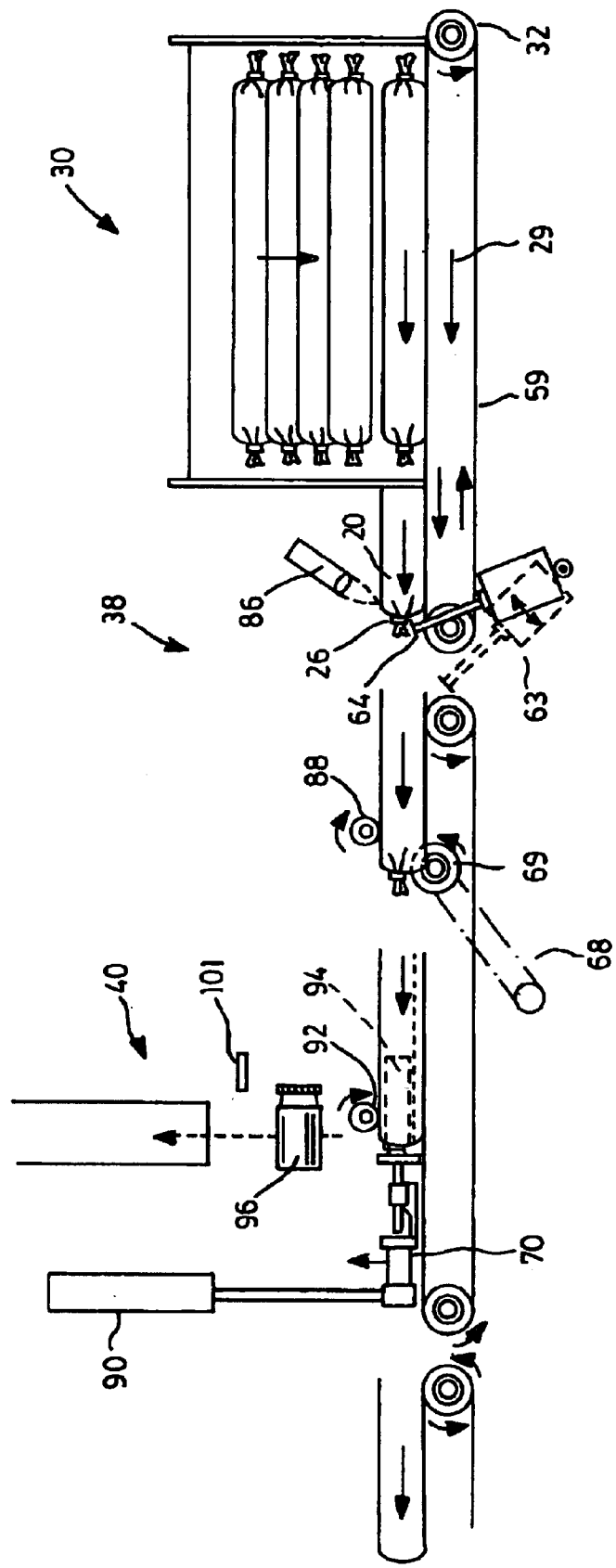
FIGS. 5 to 8 are schematic representations of the apparatus in use to remove the filmic casings and expose the product for collection and subsequent processing.

Reference is next made to FIG. 5 which is a schematic drawing illustrating the passage of the packages along the operating path 29 from the loader 30 to the cutting station 38. A leading package 20 is at the downstream end of the first part 59 of the conveyor 32 and moving along the path 29. The package 20 has met an optical sensor 86 (also seen in FIG. 3) in the cutting station 38 and at the same time, the package 20 has met the transverse cutting blade 64 which has created a transverse slit in the package under and adjacent to the clip 26. The controller 54 responds to a signal from the sensor 86 to cause the cutter 63 to move from a raised or cutting position shown in full outline, to a stored position shown in ghost outline. In the latter position the blade 64 is below the conveyor 32 and no longer in position to affect the package.

The optical sensor 86 in the cutting station 38 will also sense when the package 20 has passed the sensor and the resulting signal will cause the controller 54 to activate the transverse cutter 63 to return the cutter into the cutting position ready for the next package. The time taken to return the cutter 63 to the cutting position is a factor in the spacing between the packages as they are driven along the conveyor 32. It will be evident that similar considerations will come into play at each step of the process and that the spacing is achieved by varying the rate of movement of the tray 76 in the loader 30 as previously explained with reference to FIG. 4.

FIG. 5 also shows the action of the longitudinal cutter 66, parts of which are shown in FIGS. 3 and 5. As shown in FIG. 3, the blade 69 is about to be adjusted into a cutting position (as seen in FIG. 5) where it will cut the underside of the passing package 20 longitudinally. The action of the longitudinal cutter 68 is such that a longitudinal slit is made by the blade 69 to start at the transverse slit and to extend to the trailing end of the package. The height of the blade 69 is chosen so that there is no possibility that the longitudinal blade 69 will meet the trailing clip 26 on the package 20 to ensure that there will be no debris from the clip to contaminate the product. The length of the longitudinal slit should be as long as possible to better facilitate the stripping of the casing 22 from the product 24 in the stripper 40 as will be explained.

The longitudinal cutting action of the cutter 68 will cause a reactive force which tends to lift the package off the blade 69, and this is prevented by the use of a reaction roller 88 positioned generally above the blade 69 and free to roll on the package 20.

The package 20 has now been prepared for the stripper 40 and the controller has caused the gripper 70 to move from a raised position shown in FIG. 3 to a stored position shown in FIG. 5 where the gripper 70 is ready to grip an oncoming package 20. This is achieved by mounting the gripper on an actuator 90 which moves the gripper vertically between the two positions.

Figure 6:
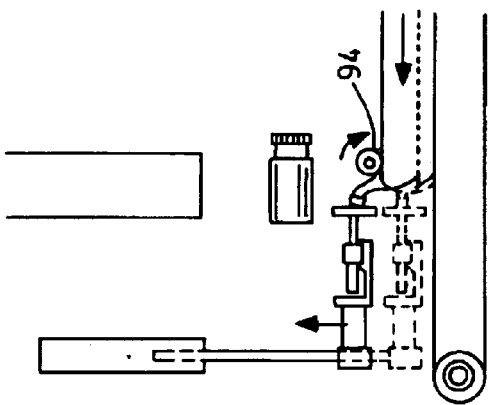

The gripper 70 is ready to be activated and will remain in this condition until the slit package meets a sensor 92 (seen diagrammatically in FIG. 3) and this combines with the controller 54 to cause the gripper 70 to grab the leading end of the package 20 complete with the associated one of the clips 26 before starting an upward movement as illustrated in FIG. 6. A pair of curved reaction plates 94 (FIG. 3) prevent the packages lifting as the gripper 70 moves upwardly. These plates can be changed or adjusted to match different product shapes and sizes.

Initially the gripper 70 moves upwardly between the plates 94 and then through a space between a pair of drive rollers 96, 98 (see also FIG. 3) in an open position. One of the rollers 96 is formed of stainless steel and the other, 98 is a compliant material, typically polyurethane, to enhance engagement of the casing 22. A doctor blade 99 ensures that the casing does not adhere to the surface of the roller 98 during removal. These rollers are driven by a motor 100 and gears 102 which mesh when rollers 96,98 are brought together into a closed position. For simplicity, the supporting structures have been omitted from the drawings. However it will become evident that the rollers are spaced apart in an open position as the gripper 70 passes and then moves into a closed position when an optical sensor 101 detects the gripper 70 in a raised position. The sensor 101 is oriented along the axis of the machine so that the mass of the gripper 70 provides a solid object for detection. Then the drive rollers are brought together about the casing and driven to assist the gripper to pull the casing upwardly off the product. At the same time the rollers squeeze the casing to cause any juices to fall downwardly onto the product and belt 46, thereby minimising waste.

Figure 8:
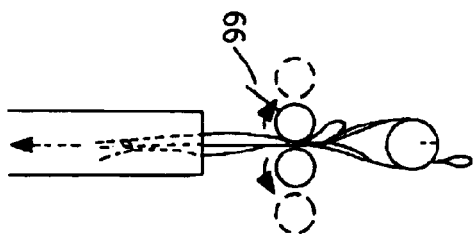
Figure 7:
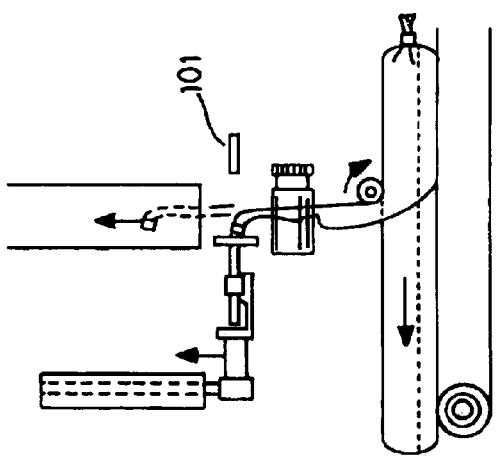

Reference is next made to FIGS. 7 and 8 which show how the spent casing is transferred from the gripper 70 to the exhaust system 42. As the gripper 70 approaches the system 42, the gripper 70 releases the casing 22 which is still driven by the rollers 96, 98. As a result the casing comes under the influence of the vacuum drawn through the pipe 44 and is swept away through the pipe 44 as it leaves the rollers.

Once the casing has left the stripper, the rollers open and the gripper is driven back into the FIG. 5 position ready for another package.

Figure 5A:
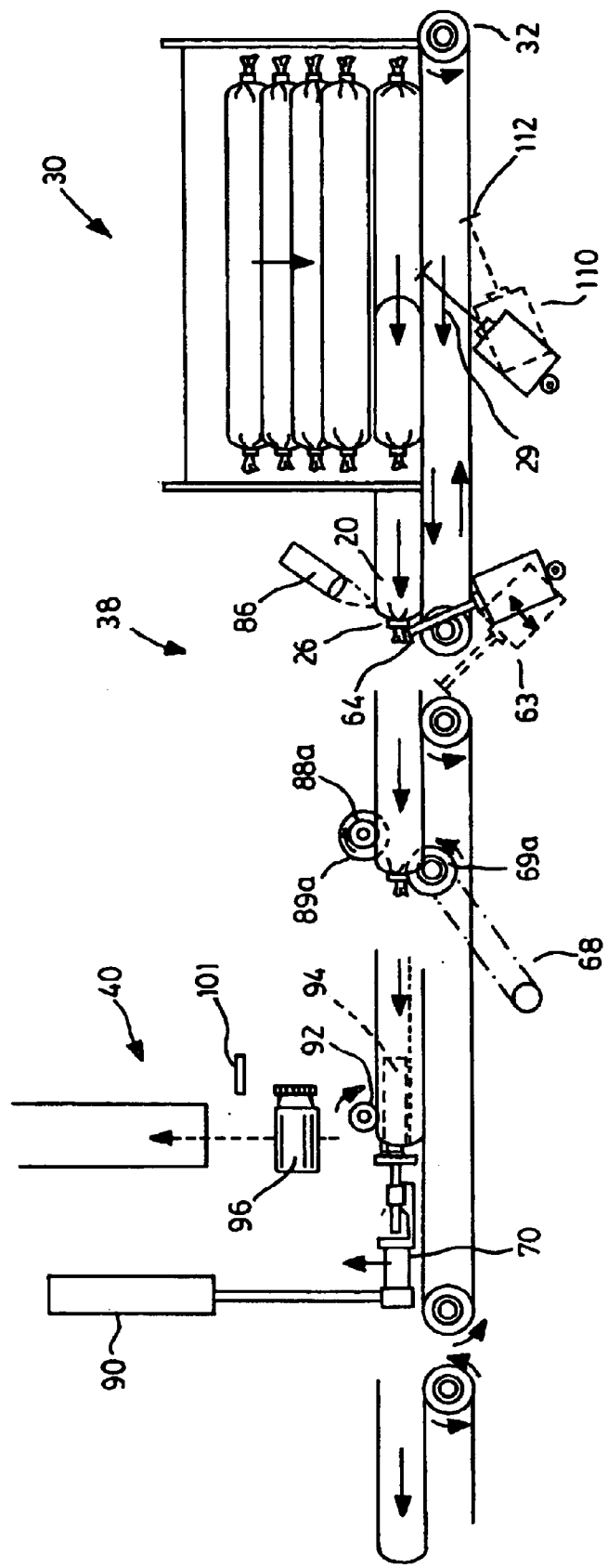
FIG. 5a is a representation similar to FIG. 5 of an alternative embodiment.

A further embodiment of the invention is shown in FIG. 5a in which like reference numerals will be used to identify like components with a suffix 'a' added for clarity. In the embodiment of FIG. 5a, a pair of additional cutters is included in the cutting station 28a to facilitate removal of the casing 22a. Referring therefore to FIG. 5a, a transverse cutter 110, similar to the cutter 63, having a driven blade 112 is mounted below the conveyor 32a. The cutter 110 is spaced from the cutter 63a and is positioned to engage the tail of the package 20a. The cutter 110a may be stored below the conveyor 32a and elevated as the package moves along the path 29a to engage that tails of the package 20a. The blade 112 cuts a transverse slit similar to that on the leading end of package 20a that is intersected by the longitudinal slit formed by the cutter 68a.

An additional longitudinal slit is cut by a cutter assembly 88a that is used in place of the hold down roller 88. The cutter assembly 88a has a blade 89a that is positioned to engage the package 20a diametrically opposite the blade 69a and cuts a slit in the casing 22a as it passes along the path 29a.

Upon presentation to the gripper 70a, the casing therefore has a pair of longitudinal slits and a transverse slit at both ends on the underside of the leading and trailing ends adjacent to the clips. The casing 22a is therefore relatively free to be removed by the gripper 70a with minimum resistance from the casing. The position of the slits is such however, that the casing does remain an integral unit to avoid disintegration during removal. It will be appreciated that the subsequent steps of stopping and transfer are performed as described with FIGS. 6–8 above.

In each of the embodiments, the controller 54 may advantageously operate the conveyors 34 and 36 on an intermittent basis through the use of the PLC controls and servo motors to facilitate operation of the stripper 40. It has been found advantageous to adjust passage through the stripper 40 as the texture and temperature of the product 24 varies. The controller 54 may be used to intercept operation of the conveyor so that the package 20 is stationary as the gripper 70 engages and lifts the casing 22. Delays of 0.2 seconds or 0.4 seconds have been found advantageous when the product is a minced beef. For high meat content products, no delay is necessary as the casing 22 is readily removed. However, as the fat content increases it has been found that the casing adheres to the product and a delay as the product reaches the gripper 70 is preferred. For highest fat content product it is preferable that the delay is sufficient for the gripper 70 to move past the rollers and for the rollers to engage the casing before the product continues to move.

It will be apparent that the delay in the operation of the conveyor 32 will depend on the particular product and conditions encountered and may be adjusted by the controller to suit.

The invention has been described with reference to an exemplary package and product. Although the invention will have particular utility with such a package, it is within the scope of this invention to provide apparatus and method for general use to strip filmic casings off product.

Of course there will be limitations due to the process used. For instance the product must be such that it is not damaged by the cutters in the cutting station. However, these are variations that will be evident and within the scope of the invention. For instance, the casing could be weakened without actually cutting it by forming lines of weakness transversely and longitudinally so that the lines of weakness will break to allow the casing to be dragged off the product. Slitting is one form of weakening the casing.

Another possible variation is to use packages that are not cylindrical. This could happen because cylindrical packages are shipped in containers where the packages on the bottom will be deformed by the weight of the packages above them. A variety of products having a range of shapes and sizes can also be accommodated although some variations to the loader and other parts will be in order without departing from the scope of the invention.

Yet another possibility is that the operating path may not be horizontal. It is not a necessary that the path be horizontal as long as the direction of action of the stripper is such that the casing leaves the product and the product can be collected.

These and other variations are within the scope of the invention as described and claimed.

What is claimed is:

1. Apparatus for removing a filmic casing from an elongate package to recover product contained in the casing, the package having first and second ends and the apparatus including:
    a transport mechanism for receiving the package and moving the package along an operating path with said first end leading;
    a cutting station positioned relative to the transport mechanism to cut the casing transversely to form a transverse slit extending partially through said package between said first end and said second end and adjacent to said first end of the casing, and to cut the casing longitudinally of the casing starting at the transverse slit to form a longitudinal slit extending longitudinally towards said second end;
    a stripper positioned to meet the package as the package progresses longitudinally from the cutting station, the stripper including a gripper to grab said first end in advance of said transverse slit and an actuator operable to move the gripper transversely to drag the filmic casing away from the packaged product so that the product can be collected.

2. Apparatus as claimed in claim 1 wherein said cutting station cuts said casing transversely to form a transverse slit in said second end.

3. Apparatus as claimed in claim 2 in which said cutting station includes a pair of transverse cutters, each arranged to make said transverse slit at a respective end of said product.

4. Apparatus as claimed in claim 2 in which the cutting station includes:
    a pair of transverse cutters each arranged to move between a cutting position to make said transverse slit at respective opposite ends of said package, and a stored position in which the cutter is positioned relative to the transport mechanism to avoid contact with the product as the product moves through the cutting station; and
    a longitudinal cutter arranged to engage and cut the casing as the package passes the cutting station.

5. Apparatus as claimed in claim 1 wherein said cutting station cuts said casing longitudinally at a second location.

6. Apparatus as claimed in claim 5 in which the cutting station includes a pair of longitudinal cutters spaced about the product and each arranged and cut the casing as the package passes the cutting station.

7. Apparatus as claimed in claim 1 in which the operating path is horizontal and the stripper moves vertically when dragging the casing off the product.

8. Apparatus as claimed in claim 1 and further including a loader coupled to the transport mechanism for loading packages on to the transport mechanism one at a time.

9. Apparatus as claimed in claim 1 in which the transport mechanism includes a V-shaped conveyor to carry the packages along the operating path.

10. Apparatus as claimed in claim 9 in which the V-shaped conveyor is made up of a pair of belt conveyors arranged at an angle to one another to form the V-shaped conveyor.

11. Apparatus as claimed in claim 1 in which the stripper further includes a pair of rollers forming a nip there between and driven to assist the gripper to drag the casing off the product as the casing is delivered by said gripper to said nip.

12. Apparatus as claimed in claim 11 wherein one of said rollers is compliant.

13. Apparatus as claimed in claim 12 wherein a doctor blade is located at the surface of one of said rollers.

14. Apparatus as claimed in claim 11 in which the rollers are movable between a closed position to drive the casing and an open position to allow the gripper to move past the rollers.

15. Apparatus as claimed in claim 14 wherein said gripper delivers said casing to an inlet of a suction conveyor.

16. Apparatus as claimed in claim 1 in which the cutting station includes a transverse cutter arranged to move between a cutting position to make said transverse slit, and a stored position in which the cutter is out of the path of the transport mechanism to avoid contact with the product as it moves through the cutting station.

17. Apparatus as claimed in claim 1 in which the cutting station includes a longitudinal cutter arranged to engage and cut the casing as the package passes the cutting station.

18. Apparatus as claimed in claim 1 in which the cutting station includes:
    a transverse cutter arranged to move between a cutting position to make said transverse slit, and a stored position in which the cutter is positioned relative to the transport mechanism to avoid contact with the product as the product moves through the cutting station; and
    a longitudinal cutter arranged to engage and cut the casing as the package passes the cutting station.

19. Apparatus as claimed in claim 1 and further including a chopper which receives the product from the stripper and breaks the product into smaller parts.

20. A method of removing a filmic casing from an elongate package to recover product contained in the casing, the package having first and second ends and the method including the steps:
    placing the package on an operating path along which the package is to travel with said first end leading;
    moving the package along the path and into a cutting station to cut the casing transversely partially through said package to form a transverse slit between said first end and said second end and adjacent to said first end of the casing, and to cut the casing longitudinally of the casing starting at the transverse slit and extending longitudinally towards said second end;
    moving the slit package from the cutting station into a stripper positioned to meet the package as the package progresses from the cutting station, grabbing the leading end of the package and moving the leading end transversely to drag the filmic casing away from the packaged product; and
    collecting the product.

21. A method according to claim 20 including the step of forming a transverse slit adjacent to said second end of said package.

22. A method according to claim 21 wherein progress of said package along said path is delayed as said gripper engages said leading end of said package.

23. A method according to claim 20 including the step of forming a further longitudinal slit in said casing.

24. Apparatus for removing a filmic casing from an elongate package to recover product contained in the casing, the package having first and second ends and the apparatus including:
    a transport mechanism for receiving the package and moving the package along an operating path with said first end leading;

a cutting station positioned relative to the transport mechanism to weaken the casing transversely to form a transverse line of weakness between said first end and said second end and adjacent to said first end of the casing, and to weaken the casing longitudinally of the casing starting at the transverse line of weakness to form a longitudinal line of weakness extending longitudinally towards said second end;

a stripper positioned to meet the package as the package progresses longitudinally from the cutting station, the stripper including a gripper to grab said first end in advance of said transverse line of weakness and an actuator operable to move the gripper transversely to drag the filmic casing away from the packaged product to break the casing along the transverse and longitudinal lines of weakness so that the product can be collected.

25. Apparatus as claimed in claim 24 in which the operating path is horizontal and the stripper moves vertically when dragging the casing off the product.

26. Apparatus as claimed in claim 24 further including a loader coupled to the transport mechanism for loading packages on to the transport mechanism one at a time.

27. Apparatus as claimed in claim 24 in which the transport mechanism includes a V-shaped conveyor to carry the packages along the operating path.

28. Apparatus as claimed in claim 27 in which the V-shaped conveyor is made up of a pair of belt conveyors arranged at an angle to one another to form the V-shaped conveyor.

29. Apparatus as claimed in claim 24 in which the stripper further includes a pair of rollers driven to assist the gripper to drag the casing off the product.

30. Apparatus as claimed in claim 24 and further including a chopper which receives the product from the stripper and breaks the product into smaller parts.

31. A method of removing a filmic casing from an elongate package to recover product contained in the casing, the package having first and second ends and the method including the steps:

placing the package on an operating path along which the package is to travel with said first end leading;

moving the package along the path and into a cutting station to weaken the casing transversely to form a transverse line of weakness between said first end and said second end and adjacent to said first end of the casing, and to weaken the casing longitudinally of the casing starting at the transverse line of weakness and extending longitudinally towards said second end;

moving the weakness package from the cutting station into a stripper positioned to meet the package as the package progresses from the cutting station, grabbing the leading end of the package in advance of said transverse line of weakness and moving the leading end transversely to break said casing and drag the filmic casing away from the packaged product; and collecting the product.

* * * * *